(12) United States Patent
Parthasarathy

(10) Patent No.: US 6,699,545 B2
(45) Date of Patent: Mar. 2, 2004

(54) METHOD FOR INCREASING SOLID STATE POLYMERIZATION RATE OF POLYESTER POLYMERS

(75) Inventor: Anju Parthasarathy, Glenmoore, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 10/128,784

(22) Filed: Apr. 22, 2002

(65) Prior Publication Data

US 2003/0139566 A1 Jul. 24, 2003

Related U.S. Application Data

(60) Provisional application No. 60/343,564, filed on Dec. 21, 2001.

(51) Int. Cl.⁷ .................. D29D 22/00; C08G 63/78; C08K 5/41
(52) U.S. Cl. .................. 428/35.7; 528/275; 528/281; 528/487; 528/503; 528/298; 528/301; 528/302; 528/307; 528/308; 528/308.6; 524/745
(58) Field of Search ............... 528/275, 281, 528/487, 503, 298, 301, 302, 307, 308, 308.6; 524/745; 428/35.7

(56) References Cited

U.S. PATENT DOCUMENTS

| | | |
|---|---|---|
| 5,198,233 A | 3/1993 | Kaiser |
| 5,340,509 A | 8/1994 | Chang et al. |
| 5,540,868 A | 7/1996 | Stouffer et al. |
| 5,644,019 A | 7/1997 | Po' et al. |
| 5,646,238 A | 7/1997 | Ikeda et al. |
| 5,670,606 A | 9/1997 | Stouffer et al. |
| 5,714,262 A | 2/1998 | Stouffer et al. |
| 5,744,074 A | 4/1998 | Stouffer et al. |
| 5,880,225 A | 3/1999 | Yang et al. |
| 5,990,265 A | 11/1999 | Blanchard et al. |

FOREIGN PATENT DOCUMENTS

| | | |
|---|---|---|
| DE | 198 49 485 | 5/2000 |
| EP | 0 675 147 | 10/1995 |
| EP | 745 629 | 12/1996 |
| EP | 0 745 630 | 12/1996 |
| EP | 0 953 589 | 11/1999 |
| WO | WO 92/03280 | 3/1992 |

OTHER PUBLICATIONS

International Search Report for PCT/US02/40331, dated Mar. 11, 2003.

*Primary Examiner*—Samuel A. Acquah
(74) *Attorney, Agent, or Firm*—Charles E. Krukiel

(57) ABSTRACT

This invention concerns a method for increasing the polymerization rate of polyester polymers in the solid state by adding a catalytic amount of zinc p-toluenesulfonate to a polyester polymer melt that is essentially free of antimony and germanium, before solid state polymerization.

17 Claims, No Drawings

METHOD FOR INCREASING SOLID STATE POLYMERIZATION RATE OF POLYESTER POLYMERS

CROSS REFERENCE TO RELATED APPLICATION

This application claims priority benefit of U.S. Provisional Patent application Serial No. 60/343,564 filed Dec. 21, 2001.

BACKGROUND OF THE INVENTION

The present invention relates to the use of zinc p-toluenesulfonate as a catalyst in preparing polyester polymers and, more particularly, to a method for increasing the polymerization rate of such polyester polymers in the solid state by the addition of zinc p-toluenesulfonate to the polymer melt.

Some processes for the manufacture of bottle-grade poly (ethylene terephthalate), PET, presently employ antimony (III) oxide (~250–280 ppm Sb) as a polymerization catalyst. Typically, these processes require 24 hours or more under solid state polymerization conditions for the polymer to achieve the requisite high intrinsic viscosity (IV) of ca. 0.82 in the solid state polymerization reactor so that the resultant poly(ethylene terephthalate) is suitable for use in blow molded bottles. In addition, there are environmental and public health concerns about the degree of metal loading and the use of heavy metal, including antimony, based catalysts in the manufacture of food-grade polymeric packaging materials.

Metal salts of sulfonic acids are known in the art as effective catalysts for polycondensation in polyester manufacture. For example, European Patent Application 745 629 describes the preparation of saturated polyesters using a catalytic system comprising at least one derivative selected from those of antimony and germanium; at least one derivative selected from those of the metals of groups I-Va, I-VIIb, VIII and lanthanides; and, optionally, a sulfonic acid having the general formula $$RSO_3H$$

wherein R represents an organic alkyl radical, linear or branched, saturated cyclic or aromatic containing up to 20 carbon atoms. Examples of sulfonic acids which can be used include p-toluenesulfonic acid. Metals such as antimony or germanium are still required for effectiveness. Also, the solid state polymerization process per se is not addressed.

U.S. Pat. No. 5,644,019 describes a high activity catalyst system for preparing poly(ethylene terephthalate) (PET) which comprises a derivative from among antimony and germanium; a titanium derivative; and one from among a group of compounds that includes sulfonic acids, such as p-toluenesulfonic acid, and their salts. Again, antimony or germanium must be present, and solid state polymerization is not addressed.

The objects of the present invention are to provide an improved process for preparing high molecular weight polyester polymers that requires less solid state polymerization time to achieve goal IV; a process that allows the use of lower levels (as weight percent or ppm) of metal catalyst; and a process that allows the use of a more environmentally benign metal catalyst than antimony or germanium.

SUMMARY OF THE INVENTION

The present invention is a method for increasing the rate of polymerization in the solid state of a low molecular weight polyester prepolymer, said method comprising the steps:

(a) introducing an effective amount of zinc p-toluenesulfonate catalyst into a polyester prepolymer melt that is essentially free of antimony or germanium;
(b) forming molten droplets of the prepolymer melt;
(c) collecting and crystallizing said droplets; such that the pellets produced are solid state polymerizable at enhanced rates.

A second aspect of the present invention is an improved process for solid-state polymerization of a low molecular weight polyester polymer having a glass transition temperature ($T_g$) greater than about 25° C., wherein said prepolymer is essentially free of antimony and germanium, said prepolymer comprising pellets of the type that are produced by metering a polyester polymer melt through a plurality of outlets in a rotatable container to form molten droplets and collecting the molten droplets as they are formed onto a moving solid surface that is maintained within a predetermined temperature range within a crystallization zone such that the pellets are maintained in contact with the surface within the crystallization zone for a predetermined period of time, said method comprising introducing into the polyester polymer melt a catalytic amount of zinc p-toluenesulfonate.

DETAILED DESCRIPTION OF THE INVENTION

The present invention resides in the discovery that the rate of polymerizing low molecular weight polyester polymers to desired higher levels of molecular weight in the solid state can be substantially increased by incorporating into the polymer melt from which the low molecular weight polymer is prepared, and which contains essentially no antimony or germanium, a catalytic amount of zinc p-toluenesulfonate.

Zinc p-toluenesulfonate (TSAZ) offers a unique combination of properties as a catalyst for the production of polyesters. It allows a lessening of the total amount of metal present in the final polymer. The metal is benign environmentally. It alleviates health and environmental concerns that arise from the use of antimony in food-contact products, since antimony is no longer needed. By increasing rates in the solid state polymerization process, it simultaneously improves process economics and minimizes side reactions and degradation. This is particularly important in the specific case of poly(ethylene terephthalate), where minimizing side reactions that produce diethylene glycol (DEG) and color-forming species is particularly desired.

The level of zinc p-toluenesulfonate (measured as zinc) for optimum results and reduced catalyst loading is in the range of from 50 ppm up to 150 ppm, but preferably 75 ppm up to 100 ppm. Higher or lower loadings can be used depending on the results desired in terms of solid state reaction rate. 75 to 100 ppm for zinc p-toluenesulfonate according to the invention compares to a typical loading of antimony catalyst of about 250 ppm, as antimony.

Polyesters

The process of the present invention is generally applicable for use regarding any dihydroxy ester of any dicarboxylic acid, or low molecular weight oligomer thereof. Diol addition, for ends balancing, would be dependent on the oligomer being processed. In the present invention, solid state polymerization rates are particularly enhanced when the hydroxyl/carboxyl (OH/COOH) ends ratio of the prepolymer that is to be solid state polymerized is greater than one.

Suitable diacid or diester components for the polyesters to which this invention pertains normally include alkyl dicarboxylic acids having 4 to 36 carbon atoms, diesters of alkyl dicarboxylic acids having 6 to 38 carbon atoms, aryl dicarboxylic acids which contain from 8 to 20 carbon atoms, diesters of aryl dicarboxylic acids which contain from 10 to 22 carbon atoms, alkyl substituted aryl dicarboxylic acids which contain from 9 to 22 carbon atoms, and diesters of alkyl substituted aryl dicarboxylic acids which contain from 11 to 22 carbon atoms. Typical alkyl dicarboxylic acids contain from 4 to 12 carbon atoms. Some representative examples of alkyl dicarboxylic acids include glutaric acid, adipic acid, pimelic acid and the like. Diesters of alkyl dicarboxylic acids will typically contain from 6 to 12 carbon atoms. A representative example of a diester of an alkyl dicarboxylic acid is azelaic acid. Aryl dicarboxylic acids will contain from 8 to 16 carbon atoms. Some representative examples of aryl dicarboxylic acids are terephthalic acid, isophthalic acid, 2,6-naphthalenedicarboxylic acid, and orthophthalic acid. Diesters of aryl dicarboxylic acids contain from 10 to 18 carbon atoms. Some representative examples of diesters of aryl dicarboxylic acids include diethyl terephthalate, diethyl isophthalate, diethyl orthophthalate, dimethyl naphthalate, diethyl naphthalate and the like. Alkyl substituted aryl dicarboxylic acids will contain from 9 to 16 carbon atoms and diesters of alkyl substituted aryl dicarboxylic acids will contain from 11 to 15 carbon atoms.

The diol component for polyesters used in practicing the invention includes glycols containing from 2 to 12 carbons atoms, glycol ethers containing from 4 to 12 carbon atoms and polyether glycols having the structural formula $HO(AO)_nH$, wherein A is an alkylene group containing from 2 to 6 carbon atoms and n is an integer from 2 to 400. Generally, such polyether glycols will have a molecular weight from about 400 to 4000. The glycols will normally contain from 2 to 8 carbon atoms, but typically from 4 to 8 carbon atoms. Some representative examples of glycols that can be utilized as the diol component include ethylene glycol, 1,3-propylene glycol, 1,2-propylene glycol, 2,2-diethyl-1,3-propane diol, 2,2-dimethyl-1,3-propane diol, 2-ethyl-2-butyl-1,3-propane diol, 2-ethyl-2-isobutyl-1,3-propane diol, 1,3-butane diol, 1,4-butane diol, 1,5-pentane diol, 1,6-hexane diol, 2,2,4-trimethyl-1,6-hexane diol, 1,3-cyclohexane dimethanol, 1,4-cyclohexane dimethanol, 2,2,4,4-tetramethyl-1,3-cyclobutane diol, isosorbide, and the like.

The polyesters of the present invention may be branched or unbranched, and may be homopolymers or copolymers.

Particularly notable are "modified polyesters" which are defined as being modified with up to 10% by weight of a comonomer. Unless indicated otherwise, by the term polyester polymer is meant modified and unmodified polyester polymers. Similarly, by the mention of a particular polyester, for example PET, is meant unmodified or modified PET. Comonomers can include diethylene glycol (DEG), triethylene glycol, 1,4-cyclohexane dimethanol, isosorbide, isophthalic acid (IPA), 2,6-naphthalene dicarboxylic acid, adipic acid and mixtures thereof. Typically preferred comonomers for PET include 0–5% by weight IPA and 0–3% by weight DEG.

Catalyst Addition

The zinc p-toluenesulfonate catalyst may be added to the low molecular weight polyester at any of a number of points in the process, provided that it is added prior to the solid state polymerization step. Preferred points of addition of the zinc p-toluenesulfonate catalyst for convenience, ease of operation, effective mixing, etc. are before the reactor; directly into the reactor; and/or into a line upstream of the particle forming/crystallizing step.

Preparation of Prepolymer Containing Zinc p-Toluenesulfonate

Two types of reactors particularly suited for incorporating the catalyst of the present invention into polyester prepolymer, namely, a pipeline reactor and a column reactor, are described below as non-limiting examples.

Pipeline Reactor

A pipeline reactor (PLR) is described in U.S. Pat. No. 5,811,496. According to this means for producing a polyester polymer, the oligomer, which is prepared remotely, is solidified and ground into a powder prior to feeding it to the pipeline reactor. Powdered oligomer is loaded into a feeder, from which it is metered into a melting device, such as, for example, a twin-screw extruder. The oligomer is melted and conveyed through the extruder and exits the extruder through a jacketed, heated transfer line. Ethylene glycol, optionally mixed with zinc p-toluenesulfonate catalyst, is injected into the molten oligomer stream through an injection valve. The catalyst may have been previously mixed with ethylene glycol at the desired concentration. A metering pump is used to control the flow of the ethylene glycol. After injection, the mixture of oligomer, ethylene glycol, and (optionally) catalyst flows through static mixers to provide improved mixing between the oligomer and ethylene glycol.

Esterification of the oligomer and glycol occurs in the pipeline reactor section, providing balancing of hydroxyl (OH) and carboxyl (COOH) ends by the incorporation of ethylene glycol into the oligomer, thus reducing the number of carboxyl ends and increasing the mole ratio of ethylene glycol/terephthalic acid, to allow the production of high molecular weight polymer in subsequent processing steps.

An inert gas, preferably nitrogen, is injected into the center of the melt stream at the end of the first stage of the pipeline reactor to thereby reduce the partial pressure of the ethylene glycol in the second stage of the pipeline reactor and allow polymerization to proceed as desired. The degree of polymerization upon exit may be controlled by varying the nitrogen flow rate using a metering valve.

As stated above, the zinc p-toluenesulfonate catalyst may be added to the process at any of several points in the process of producing the prepolymer melt, provided that it is added prior to solid state polymerization. For example, convenient points of addition of the zinc p-toluenesulfonate catalyst may be with the ground oligomer feed, the ethylene glycol as described above, or into the line exiting the reactor, but upstream of the particle forming/crystallizing step.

Column Reactor

A column reactor (CR) of the type described in U.S. Pat. No. 5,786,443 may also be used to prepare the polyester prepolymer for carrying out the present invention. A column reactor provides a continuous process for preparing polyester prepolymer comprising the steps of reacting the esterified oligomer with diol, and passing the product downward through a countercurrent column reactor, while inert gas flows upward through the reactor.

The zinc p-toluenesulfonate catalyst may be added to the polyester polymer at any of a number of points in the process, provided that it is added prior to solid state polymerization. For example, it can be added to the column reactor through a side stream or injected into the product prepolymer melt upstream of the particle forming/crystallizing step.

Polymer Particle Formation and Crystallization

The invention is particularly applicable to low molecular weight polyester polymers, i.e., prepolymers and oligomers intended as feedstock for higher molecular weight polyester polymers, in the form of small particles or pellets. These pellets may be crystallized by any method known in the art. In one particularly effective method, oligomer or prepolymer can be converted into particles and crystallized as described in detail in U.S. Pat. No. 5, 540,868. In that case, prepolymer pellets are melted in a pellet former commonly referred to as a pastillator, and molten polymer droplets are formed by metering the polymer melt through a plurality of outlets, each typically 0.5 to 5 mm in diameter, in a rotatable container. The droplets formed are collected on a solid moving surface. The molten droplets are crystallized by being placed in contact with this solid surface between a minimum and maximum temperature as defined below, whereby they sustain a rapid change in temperature and remain between the minimum and maximum temperature long enough for crystallization to occur. The minimum temperature is defined as $T_{min}=T_g+10°$ C., where $T_g$ is the glass transition temperature of the oligomer. The maximum temperature is defined as $T_{max}=T_c+0.5(T_m-T_c)$, where $T_m$ is the melting point of the oligomer and $T_c$ is the calculated temperature of maximum crystallization rate, $T_g+0.5(T_m-T_g)$.

The crystallized particles are then introduced to a solid state polymerization reactor of any suitable design.

As part of an integrated commercial production process, the droplet former will typically be in communication, via a conduit or other material transfer means, with a means for producing the polyester polymer in melt form, for example, an extruder, which can heat the feedstock to the melt temperature or higher and extrude the molten polymer in various shapes for subsequent transfer to the droplet former.

Descriptions of the analytical techniques, catalyst materials, catalyst addition methods, reactors, particle formation methods, and solid state polymerization methods used in the following non-limiting examples of the present invention are given below.

Analytical Techniques

Solution viscosities (IV) reported below were obtained with a Forced Flow Viscometer manufactured by Viscotek Corporation (Houston, Tex.). Polymers were dissolved in trifluoroacetic acid/methylene chloride. The solution viscosity data reported here have been correlated to the intrinsic viscosity in 60/40 wt % phenol/tetrachloroethane following ASTM D4603-96. The degree of polymerization (DP) was calculated from the measured IV, using the formula $$DP=\{(IV* 1.1986+0.0023)/0.032\}^{1.466}$$

COOH End groups were determined using Fourier Transform Infrared spectroscopy on polyester samples that had been dried and pressed into film. Peak absorptions were found at 3434 cm−1 with respect to a baseline drawn from 3473 to 3386 and at 3266 with respect to a baseline drawn from 3717 to 620. The ratio of the 3434 to 3266 peak absorptions was compared to a calibration chart of such ratios versus titration data to obtain the concentration of COOH end groups.

OH end groups were then calculated from the COOH end groups and the DP, that had been determined from the IV, using the formula $$OH\ ends,\ meq/kg=\{2*10^6/(192*DP+33)\}-[COOH]$$

Catalyst Materials

The following materials were used as obtained with no further purification:

Zinc p-toluenesulfonate·xH$_2$O (TSAZ), as obtained from Aldrich (Milwaukee, Wis.).

Zinc oxide of 99+% purity, as obtained from Aldrich.

p-toluenesulfonic acid of 98.5% purity, as obtained from Aldrich.

Ethylene glycol (EG), as obtained from E. I. Du Pont de Nemours and Company (Wilmington, Del.).

Zinc acetate of 98% purity, obtained from Aldrich.

Antimony glycollate, obtained from DuPont.

Isosorbide, obtained from DuPont.

Germanium oxide in ethylene glycol, obtained from Meldform Germanium (Royston, Hertfordshire, UK)

Zinc p-Toluenesulfonate (TSAZ)/Ethylene Glycol Solution Preparation

I L of ethylene glycol (EG) was heated to 75° C. while stirring. 13.3 g of zinc oxide was added while EG was warming up. When the solution temperature reached 75° C., p-toluenesulfonic acid (62 g) was added in small increments, while stirring. A small amount of white solid remained undissolved. The temperature of the mixture was raised to 85° C. and kept there for 1 h. A very small amount of solid still remained at the bottom of the container. The EG solution of the catalyst was decanted and used.

Addition of the Catalyst to the Polyester

CAT-Method A. Dichloromethane (300 ml) or methanol (300 ml) was added to the prepolymer (IV ~0.20) or a mixture of prepolymers and was stirred to make a slurry. The catalyst was added to the slurry in a nitrogen atmosphere and was stirred at 40–55° C. for 4 hours. The solvent was evaporated under vacuum and the polymer, charged with the catalyst, was isolated as a powder.

CAT-Method B. Powdered catalyst was mixed with powdered prepolymer (IV ~0.20) in a bottle. The bottle was shaken thoroughly to mix the ingredients.

CAT-Method C. A solution of the catalyst in EG was added to an extruder in the transfer line going from the melt-reactor to the particle maker.

CAT-Method D. A solution of the catalyst in EG was added to an extruder in the transfer line going into the melt-reactor.

Reactors

In Examples 7 (Comparative), 8, 21 (Comparative), 22, and 23 (Comparative), a pipeline reactor (PLR) was employed to produce polyester prepolymer from oligomer.

In Examples 9 through 20, a column reactor (CR) was used to prepare the prepolymer.

Particle-formation (PF)

PF-method-A: On the extruder/turntable: The prepolymer/catalyst mixture was melted and processed at 290° C. through a 16 mm twin screw extruder at 0.5 lb/hr. The melt extruded through a 0.1 mm die forming individual droplets that fell 1.3 cm through room temperature air onto a heated turntable. The temperature of the turntable surface was maintained at 120° C. The turntable provided precise regulation of surface temperature and residence time on the heated surface, with continuous particle formation from the extruder. The device consisted of a rotary actuator driven by a stepper motor, a rotating stainless steel turntable in contact with a stationary heated plate. The temperature of the turntable surface was controlled through manipulation of the temperature of the stationary plate. A calibration curve was generated for the controlled measured temperature of the stationary plate versus the surface temperature of the turntable so that a thermocouple did not have to be attached to the rotating turntable during the crystallization. After about 300 degrees of rotation on the turntable, which corresponds to a residence time of 30 sec on the turntable at a prescribed speed, the crystallized particles hit a block of Teflon® fluoropolymer which knocked them off the turntable and into a room temperature collection bin.

PF-method-B: On the particle former: A prepolymer/catalyst mixture was melted and processed at 290° C. through a 16 mm twin screw extruder at 0.5 lb/hr. The melt extruded through a 0.1 mm die forming individual droplets that fell 1.3 cm through room temperature air onto the particle-former belt maintained at 140° C.

PF-method-C: Continuous operation: The catalyst was added to the melt as in CAT-Method-D. The melt exiting from the reactor was extruded through a 0.1 mm die forming individual droplets that fell 1.3 cm through room temperature air onto the particle-former belt maintained at 140° C.

Solid-state Polymerization (SSP)

SSP-Method-A: Fifty grams of particles was loaded into a glass tube (5.1 cm D, 40.6 cm H) that was surrounded by a larger diameter glass tube. A controlled volumetric flow rate and temperature of nitrogen passed through a porous disk distributor at the bottom of the column and then through the 5.1 cm D reactor. Heated air passed through the outside glass tube to insulate the reactor from heat loss. Particles were removed from the tube, using a suction device, after a prescribed time at the desired temperature. The following programs were used:

| Duration, min | $N_2$ flow, l/min | Air flow, l/min | $N_2$ temp, ° C. | Air temp, ° C. |
|---|---|---|---|---|
| Program for SSP at 220° C. | | | | |
| 15 | 200 | 150 | 25 to 220 | 25 to 220 |
| 1440 (for 24 h) or 2160 (for 36 h) | 40 | 150 | 220 | 220 |
| 15 | 200 | 150 | 220 to 25 | 220 to 25 |
| Program for SSP at 225° C. | | | | |
| 15 | 200 | 150 | 25 to 225 | 25 to 225 |
| 1440 (for 24 h) or 2160 (for 36 h) | 40 | 150 | 225 | 225 |
| 15 | 200 | 150 | 225 to 25 | 225 to 25 |
| Program for SSP at 230° C. | | | | |
| 15 | 200 | 150 | 25 to 230 | 25 to 230 |
| 1440 (for 24 h) or 2160 (for 36 h) | 40 | 150 | 230 | 230 |
| 15 | 200 | 150 | 230 to 25 | 230 to 25 |

SSP-Method-B: Particles were loaded into a hopper on top of a stainless steel column that was surrounded by band heaters and glass-wool insulation. A controlled volumetric flow rate and temperature of nitrogen was injected at the bottom of the column, through the particles and exited at the top of the column. The particles were heated by the hot nitrogen to the desired temp. Band-heaters and insulation were used to prevent heat loss from the column.

SSP Method-C: Fifteen grams of particles was loaded into a metal tube (2.8 cm D, 10.0 cm H), that was fitted with a porous disk at its bottom. The tube was inserted into a metal block that was heated by band heaters and was insulated to prevent heat loss from the tube. A controlled volumetric flow rate and temperature of nitrogen was injected at the bottom of the tube, through the particles and exited at the top of the tube. Particles were removed from the tube, using a suction device, after a prescribed time at the desired temperature.

EXAMPLE 1

The catalyst zinc p(toluenesulfonate) (TSAZ) (0.188 g) was added, using CAT-Method A, to 300 g PET with an IV of 0.197 dL/g and COOH ends of 139 eq/$10^6$ g, which had been produced by a melt-phase polymerization without a catalyst. The PET/catalyst powder was made into particles using PF-Method-A and solid-state polymerized at 220 and 230° C. using SSP-Method-A.

EXAMPLE-2

The catalyst TSAZ (0.188 g) was added, using CAT-Method B, to 300 g of PET with an IV of 0.178 dL/g and COOH ends of 85 eq/$10^6$ g, which had been produced by a melt-phase polymerization without a catalyst. The PET/catalyst powder was made into particles using PF-Method-A and solid-state polymerized at 230° C. using SSP-Method-A.

EXAMPLE 3

The catalyst TSAZ (0.188 g) was added, using CAT-Method B, to 300 g of PET with an IV of 0.210 dL/g and COOH ends of 228 eq/$10^6$ g, which had been produced by a melt-phase polymerization without a catalyst. The PET/catalyst powder was made into particles using PF-Method-A and solid-state polymerized at 230° C. using SSP-Method-A.

EXAMPLE 4 (COMPARATIVE)

The catalyst antimony glycollate (0.131 g) was added, using CAT-Method B, to 300 g of PET with an IV of 0.210 dL/g and COOH ends of 228 eq/$10^6$ g, which had been produced by a melt-phase polymerization without a catalyst. The PET/catalyst powder was made into particles using PF-Method-A and solid-state polymerized at 230° C. using SSP-Method-A.

The results shown in the table below demonstrate the improved efficacy of the TSAZ catalyst over antimony glycollate under similar conditions.

| Example | SSP temp., ° C. | IV of the particles before SSP, dL/g | COOH of the particles before SSP, eq/$10^6$ g | IV after 24 h SSP, dL/g | COOH after 24 h SSP, eq/$10^6$ g |
|---|---|---|---|---|---|
| 1 | 220 | 0.188 | 157 | 0.544 | 36 |
| 1 | 230 | 0.191 | 171 | 0.662 | 46 |
| 2 | 230 | 0.169 | 142 | 0.724 | 44 |
| 3 | 230 | 0.172 | 282 | 0.647 | 80 |
| 4(comp) | 230 | 0.189 | 222 | 0.509 | 57 |

EXAMPLE 5

The catalyst TSAZ (0.195 g) was added, using CAT-Method B, to 300 g of PET with an IV of 0.197 dL/g and COOH ends of 139 eq/$10^6$ g, which had been produced by a melt-phase polymerization without a catalyst. The PET/catalyst powder was made into particles using PF-Method-A and solid-state polymerized at 230° C. using SSP-Method-A.

EXAMPLE 6

TSAZ (0.195 g, zinc p-toluenesulfonate) was added, using CAT-Method B, to 300 g of PET with an IV of 0.178 dL/g and COOH ends of 85 eq/$10^6$ g, which had been produced by a melt-phase polymerization without a catalyst. The PET/catalyst powder was made into particles using PF-Method-A and solid-state polymerized at 230° C. using SSP-Method-A.

| Example | SSP temp., ° C. | IV of the particles before SSP, dL/g | COOH of the particles before SSP, eq/$10^6$ g | IV after 24 h SSP, dL/g | COOH after 24 h SSP, eq/$10^6$ g |
|---|---|---|---|---|---|
| 5 | 230 | 0.198 | 160 | 0.783 | 60 |
| 6 | 230 | 0.180 | 114 | 0.700 | 51 |

PLR Runs (Examples 7 (Comparative), 8)

EXAMPLE 7 (COMPARATIVE)

A catalyst solution, containing 4.85 g antimony glycollate and 6.65 g zinc p-toluenesulfonate per lb of ethylene glycol, was added at 0.6 ml/min rate to PET with an IV of 0.103 dL/g and COOH ends of 732 eq/$10^6$ g, which had been produced by esterification of TPA and ethylene glycol without a catalyst. The melt polymerization was done using CAT-Method-D in PLR, where the reactor temperature was kept at 270° C. and the flasher temperature was at 290° C. Particles were made using PF-Method-A. A prepolymer with an IV of 0.267 dL/g and COOH ends of 135±2 eq/$10^6$ g was obtained. The particles were solid state polymerized at 220 and 230° C. using SSP-Method-A.

EXAMPLE 8

A catalyst solution, containing 8.16 g zinc p-toluenesulfonate per lb of ethylene glycol, was added at 0.6 ml/min rate to PET with an IV of 0.103 dL/g and COOH ends of 732 eq/$10^6$g, which had been produced by esterification of TPA and ethylene glycol without a catalyst. The melt polymerization using CAT-Method-D in PLR, where the reactor temperature was kept at 265° C. and the flasher temperature was at 265° C. Particles were made using PF-method-A. A prepolymer with an IV of 0.227 dL/g and COOH ends of 106±3 eq/$10^6$ g was obtained. The particles were solid state polymerized at 220 and 230° C. using SSP-Method-A.

As seen in the table below, TSAZ performs substantially as well as TSAZ plus Sb; thus, the presence of Sb is unnecessary.

| Example | Catalyst | SSP temp., ° C. | IV before SSP, dL/g | COOH before SSP, eq/$10^6$ g | IV after 24 h SSP, dL/g | COOH after 24 h SSP, eq.$10^6$ g |
|---|---|---|---|---|---|---|
| 7(comp) | TSAZ, Sb | 220 | 0.267 | 137 | 0.694 | 40 |
| 7(comp) | TSAZ, Sb | 230 | 0.267 | 133 | 0.891 | 34 |
| 8 | TSAZ | 220 | 0.227 | 109 | 0.715 | 38 |
| 8 | TSAZ | 230 | 0.229 | 103 | 0.825 | 39 |

The prepolymer preparation in Examples 9 through 20 was carried out in a larger scale facility using a column reactor (CR) of the type described above.

EXAMPLE 9

PET with an IV of 0.265 dL/g and COOH ends of 184 eq/$10^6$ g, which was produced by melt-phase polymerization in the CR (CAT-Method-D) running at 100 lb/hour, and which contained 100 ppm Zn from zinc p-toluenesulfonate as a catalyst, was converted into particles using PF-Method-B. The particles were solid state polymerized at 220 and 230° C. (in duplicate), using SSP-Method-A.

| Example | SSP temp., ° C. | IV of the particles before SSP, dL/g | COOH of the particles before SSP, eq/$10^6$ g | IV after 24 h SSP, dL/g | COOH after 24 h SSP, eq/$10^6$ g | Time to 0.82 IV, h |
|---|---|---|---|---|---|---|
| 9 | 220 | 0.259 | 180 | 0.821 | 66 | 24 |
| 9 | 230 | 0.259 | 182 | 0.998 | 54 | 8 |
| 9 | 230 | 0.259 | 175 | 0.986 | 44 | 10 |

EXAMPLES 10 THROUGH 15 (COMPARATIVE)

In each case, the catalyst zinc acetate (0.0253 g, 100 ppm zinc) was added, using CAT-Method B, to 150 g of PET which had been produced by a melt-phase polymerization without a catalyst. The initial IV (dL/g), COOH (eq/$10^6$ g), and OH/COOH ratio are given in the Table. The PET/catalyst powder was made into particles using PF-Method-A and solid-state polymerized at 230° C. using SSP-Method-C. After 24 h of solid-state polymerization, the IV of each sample was far less than observed using the TSAZ catalyst according to the invention, e.g., in Example 9 at 230° C. Thus, it is not simply the presence of zinc that improves performance, but the TSAZ catalyst of the present invention.

| Example (Comparative) | IV of the particles before SSP, dL/g | COOH of the particles before SSP, eq/$10^6$ g | OH/COOH of the particles before SSP | IV after 24 h SSP, dL/g | COOH after 24 h SSP, eq/$10^6$ g |
|---|---|---|---|---|---|
| 10 | 0.178 | 85 | 6.40 | 0.536 | 32 |
| 11 | 0.196 | 119 | 3.71 | 0.553 | 29 |
| 12 | 0.210 | 228 | 1.18 | 0.623 | 65 |
| 13 | 0.238 | 314 | 3.14 | 0.567 | 28 |
| 14 | 0.238 | 264 | 1.76 | 0.633 | 45 |
| 15 | 0.238 | 214 | 1.07 | 0.639 | 62 |

PET samples containing 2.45(+−0.12) wt % IPA comonomer and 1.07(=−0.19) wt % diethylene glycol comonomer, with OH/COOH ratios ranging from 0.89 to 2.73 as described in the table below, were produced by melt-phase polymerization in the CR running at 100 lb/hour, containing 100 ppm Zn from zinc p-toluenesulfonate as a catalyst for SSP (CAT-Method-C). The PET samples were converted into particles using PF-method-C. The particles were solid state polymerized at 230° C., using SSP-Method-C The data indicate that PET with an IV of at least 0.82 is produced with the TSAZ catalyst in less than 24 hours under these conditions when the feed OH/COOH ratio is above 1.

| Example | COOH before SSP, eq/$10^6$ g | IV before SSP, dL/g | OH/COOH before SSP | IV after 24 h SSP, dL/g | COOH after 24 h SSP, eq/$10^6$ g | Time to 0.82 IV (hours) |
|---|---|---|---|---|---|---|
| 16 | 245 | 0.248 | 0.63 | 0.538 | 110 | >24 |
| 17 | 246 | 0.213 | 0.89 | 0.730 | 85 | >24 |
| 18 | 211 | 0.208 | 1.20 | 0.907 | 59 | 12.5 |
| 19 | 170 | 0.206 | 2.15 | 0.965 | 51 | 11.5 |
| 20 | 156 | 0.189 | 2.73 | 0.918 | 49 | 13 |

EXAMPLE 21 (COMPARATIVE)

A catalyst solution, containing 14.3 g antimony glycollate (Sb) per lb of ethylene glycol, was added at 0.6 ml/min rate to PET with an IV of 0.103 dL/g and COOH ends of 732 eq/$10^6$ g, which had been produced by esterification of TPA and ethylene glycol without a catalyst and to which isosorbide was being added at a rate of 114.8 g per hour. The melt polymerization was done using CAT-Method-D in PLR, where the reactor temperature was kept at 265° C. and the flasher temperature was at 290° C. Particles were made using PF-Method-A, where the melt at 256° C. was crystallized on turntable with surface temperature of 140° C. and the residence time on the turntable was 40 sec. A prepolymer with an IV of 0.183 dL/g, COOH ends of 127 eq/$10^6$ g and isosorbide concentration (by solution-NMR) of 3.39 mol % was obtained. The particles were solid state polymerized at 225° C. using SSP-Method-C.

EXAMPLE 22

A catalyst solution, containing 16.32 g zinc p-toluenesulfonate (TSAZ) per lb of ethylene glycol, was added at 0.6 ml/min rate to PET with an IV of 0.103 dL/g and COOH ends of 732 eq/$10^6$ g, which had been produced by esterification of TPA and ethylene glycol without a catalyst and to which isosorbide was being added at a rate of 114.8 g per hour. The melt polymerization was done using CAT-Method-D in PLR, where the reactor temperature was kept at 265° C. and the flasher temperature was at 290° C. Particles were made using PF-Method-A, where the melt at 256° C. was crystallized on turntable with surface temperature of 140° C. and the residence time on the turntable was 70 sec. A prepolymer with an IV of 0.214 dL/g, COOH ends of 107eq/$10^6$ g and isosorbide concentration (by solution-NMR) of 3.19 mol % was obtained. The particles were solid state polymerized at 225° C. using SSP-Method-C.

EXAMPLE 23 (COMPARATIVE)

A catalyst solution, containing germanium oxide (Ge) in ethylene glycol in concentration necessary to give 100 ppm Ge in the polymer, when added at 0.6 ml/min rate to PET with an IV of 0.103 dL/g and COOH ends of 732 eq/$10^6$ g, which had been produced by esterification of TPA and ethylene glycol without a catalyst and to which isosorbide was being added at a rate of 114.8 g per hour. The melt polymerization was done using CAT-Method-D in PLR, where the reactor temperature was kept at 265° C. and the flasher temperature was at 290° C. Particles were made using PF-Method-A, where the melt at 277° C. was crystallized on turntable with surface temperature of 140° C. and the residence time on the turntable was 40 sec. A prepolymer with an IV of 0.167 dL/g, COOH ends of 147eq/$10^6$ g and isosorbide concentration (by solution-NMR) of 3.01 mol % was obtained. The particles were solid state polymerized at 225° C. using SSP-Method-C.

| Example | Catalyst metal | Catalyst metal, ppm | SSP temp., ° C. | IV before SSP, dL/g | COOH before SSP, eq/$10^6$ g | IV after 24 h SSP, dL/g | COOH after 24 h SSP, eq/$10^6$ g |
|---|---|---|---|---|---|---|---|
| 21 (comparative) | Sb | 280 | 225 | 0.206 | 133 | 0.690 | 60 |
| 22 | Zn | 100 | 225 | 0.216 | 107 | 1.440 | 42 |
| 23 (comparative) | Ge | 100 | 225 | 0.189 | 151 | 0.639 | 22 |

What is claimed is:

1. A method for increasing the rate of polymerization in the solid state of a low molecular weight polyester prepolymer, said method comprising the steps:
   (a) introducing an effective amount of zinc p-toluenesulfonate catalyst into a polyester prepolymer melt that is essentially free of antimony or germanium;
   (b) forming molten droplets of the prepolymer melt;
   (c) collecting and crystallizing said droplets; such that the pellets produced are solid state polymerizable at enhanced rates.

2. A method for increasing the rate of polymerization of a low molecular weight polyester prepolymer in the solid state, wherein said prepolymer is essentially free of antimony and germanium, said prepolymer comprising pellets of the type that are produced by metering a polyester polymer melt through a plurality of outlets in a rotatable container to form molten droplets and collecting the molten droplets as they are formed onto a moving solid surface that is maintained within a predetermined temperature range within a crystallization zone such that the pellets are maintained in contact with the surface within the crystallization zone for a predetermined period of time, said method comprising introducing into the polyester polymer melt a catalytic amount of zinc p-toluenesulfonate.

3. The method of claim 1 in which the catalytic amount of zinc p-toluenesulfonate is in the range of 50 ppm to 150 ppm by weight, based on zinc.

4. The method of claim 2 in which the catalytic amount of zinc p-toluenesulfonate is in the range of 50 ppm to 150 ppm by weight, based on zinc.

5. The method of claim 3 in which the catalytic amount of zinc p-toluenesulfonate is in the range of 75 ppm to 100 ppm by weight, based on zinc.

6. The method of claim 4 in which the catalytic amount of zinc p-toluenesulfonate is in the range of 75 ppm to 100 ppm by weight, based on zinc.

7. The method of claim 2 in which the glass transition temperature of the polyester is at least 25° C.

8. The method of claim 1 in which the polyester prepolymer is PET.

9. The method of claim 2 in which the polyester prepolymer is PET.

10. The method of claim 8 in which the polymer is modified with up to about 10% by weight of a comonomer.

11. The method of claim 9 in which the polymer is modified with up to about 10% by weight of a comonomer.

12. The method of claim 10, in which the comonomer is selected from the group consisting of: diethylene glycol, isosorbide, isophthalic acid, triethylene glycol, 1,4-cyclohexane dimethanol, 2,6-naphthalene dicarboxylic acid, adipic acid and mixtures thereof.

13. The method of claim 11, in which the comonomer is selected from the group consisting of: diethylene glycol, isosorbide, isophthalic acid, triethylene glycol, 1,4-cyclohexane dimethanol, 2,6-naphthalene dicarboxylic acid, adipic acid and mixtures thereof.

14. The method of claim 1, in which the ratio of the hydroxyl to carboxyl end groups of the feed polyester is at least 1.

15. The method of claim 2, in which the ratio of the hydroxyl to carboxyl end groups of the feed polyester is at least 1.

16. A polyester resin containing 50 to 150 ppm zinc by weight from zinc p-toluenesulfonate, wherein said resin is essentially free of antimony and germanium.

17. A blow molded container made from the polyester resin of claim 16.

* * * * *